United States Patent [19]

Steele

[11] E Re. 28,473

[45] Reissued July 8, 1975

[54] PRIMARY EXPLOSIVE COMPOSITIONS FOR EXPLOSIVE BONDING OR FORMING

[75] Inventor: Terri Giversen Steele, Hamilton Twp., Mercer County, N.J.

[73] Assignee: Western Electric Company, Inc., New York, N.Y.

[22] Filed: Nov. 15, 1974

[21] Appl. No.: 524,281

Related U.S. Patent Documents

Reissue of:

[64] Patent No.: 3,704,186
Issued: Nov. 28, 1972
Appl. No.: 174,194
Filed: Aug. 23, 1971

[52] U.S. Cl. ..... 149/35; 149/94; 149/110
[51] Int. Cl.[2] ..... C06C 1/02
[58] Field of Search ..... 149/35, 94, 109

[56] References Cited

UNITED STATES PATENTS

| | | | |
|---|---|---|---|
| 3,634,155 | 1/1972 | Prior et al. | 149/35 X |
| 3,808,161 | 4/1974 | Pierce | 149/35 X |

FOREIGN PATENTS OR APPLICATIONS

| | | | |
|---|---|---|---|
| 687,341 | 5/1964 | Canada | 149/35 |

*Primary Examiner*—Benjamin R. Padgett
*Assistant Examiner*—P. A. Nelson
*Attorney, Agent, or Firm*—Jack Schuman

[57] ABSTRACT

A screenable primary explosive composition for explosive bonding or forming consists of 60–70 percent by weight of colloidal lead azide, and the balance a vehicle having (1) approximately 92 percent by weight of beta-terpineol and approximately 8 percent by weight of ethyl cellulose, or (2) approximately 90 percent by weight of beta-terpineol and approximately 10 percent by weight of polyvinyl butyral, or (3) approximately 92 percent by weight of pine oil and approximately 8 percent by weight of ethyl cellulose. Where difficulty is encountered in mixing the lead azide in the higher weight percentage with the vehicle, particularly where the vehicle consists of beta-terpineol and ethyl cellulose, the lead azide may be moistened with a small amount of nitrocellulose (e.g. 0.05 ml. nitrocellulose/gm. lead azide and vehicle) to facilitate mixing with the vehicle.

14 Claims, No Drawings

PRIMARY EXPLOSIVE COMPOSITIONS FOR EXPLOSIVE BONDING OR FORMING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates broadly to compositions for explosive bonding or foaming. More specifically, this invention relates to an improved primary explosive composition which may be applied to a body through silk screen or similar techniques in a precise geometric configuration for use in explosive bonding or forming and which is particularly useful in micro-scale operations.

2. Description of the Prior Art

Explosive bonding or forming processes are known. The explosive materials and systems used therein have been less than satisfactory in one or more respects. Particularly, these processes employ secondary explosives which require primary explosives for detonation. Such conventional processes are necessarily operated on a gross or macro-scale because of the high critical mass of the secondary explosives and because of the required detonation systems. Also, these materials have not been capable of application in precise geometric configurations through silk screen techniques. Copending U.S. Pat. application Ser. No. 68,431, filed Aug. 31, 1970 and entitled "Explosive Bonding of Workpieces" represents a considerable advance in the art of explosive bonding, disclosing inter alia the use of the primary explosive lead azide, dissolved in some suitable chemical solution to facilitate stencilling, as the explosive material.

SUMMARY OF THE INVENTION

One of the objects of this invention is to provide an improved composition for explosive bonding or forming.

Another of the objects of this invention is to provide an improved primary explosive composition which may be applied to a body through silk screen or similar techniques in a precise geometric configuration on a micro-scale for use in explosive bonding or forming or similar processes.

Other and further objects of this invention will become apparent during the course of the following description and by reference to the appended claims.

Briefly, I have discovered that the foregoing objects may be attained by compounding a mixture containing 60–70 percent by weight of colloidal lead azide and the balance a vehicle having (1) approximately 92 percent by weight of beta-terpineol and approximately 8 percent by weight of ethyl cellulose or (2) approximately 90 percent by weight of beta-terpineol and approximately 10 percent by weight of polyvinyl butyral, or (3) approximately 92 percent by weight of pine oil and approximately 8 percent by weight of ethyl cellulose. Where difficulty is encountered in mixing the lead azide in the higher weight percentages, particularly where the vehicle consists of beta-terpineol and ethyl cellulose, the lead azide may be moistened with a small amount of nitrocellulose (e.g., 0.05 ml. nitrocellulose/gm. lead azide and vehicle) to facilitate mixing with the vehicle.

DESCRIPTION OF THE PREFERRED EMBODIMENTS

The ideal primary explosive composition for explosive bonding or forming, particularly on a micro-scale, should exhibit the following characteristics:

(1) The composition should screen or stencil accurately.

(2) The composition should not dry anywhere in its bulk throughout the process, where the primary explosive material incorporated therein is sensitive to friction.

(3) The composition should adhere resonably well to the piece part which is to be joined or formed, or to the buffer sheet (a carrier which may be used between the composition and the piece parts to be joined) which may, for example, be a plastic type material. The composition need not be extremely tenacious, but should at least remain in place during handling operations.

(4) The composition must be homogeneous throughout its bulk, thereby to provide a well-distributed pressure disturbance.

(5) The detonation velocity of the composition must be sufficient for the purpose at hand.

The following compositions have been found to meet the above mentioned criteria.

EXAMPLE I

| | Percent by weight |
|---|---|
| Lead azide, $PbN_6$: Colloidal, mean particle size 3.4$\mu$ as determined by MIL-STD-286 (1956), Method No. 506.1 | 60–70 |
| Vehicle, consisting of approximately: 8% by weight of ethyl cellulose, 92% by weight of beta-terpineol | 40–30 |
| | 100 |

The proportions of ethyl cellulose and beta-terpineol in the vehicle may be varied slightly to adjust the viscosity of the vehicle to the desired value for screening.

EXAMPLE II

| | Percent by weight |
|---|---|
| Lead azide, $PbN_6$: Colloidal, mean particle size 3.4$\mu$ as determined by MIL-STD-286 (1956), Method No. 506.1 | 60–70 |
| Vehicle, consisting of approximately: 10% by weight of Butvar (polyvinyl butyral), 90% by weight of beta-terpineol | 40–30 |
| | 100 |

The proportions of Butvar (polyvinyl butyral) and beta-terpineol in the vehicle may be varied slightly to adjust the viscosity of the vehicle to the desired value for screening.

EXAMPLE III

| | Percent by weight |
|---|---|
| Lead azide, $PbN_6$: Colloidal, mean particle size 3.4$\mu$ as determined by MIL-STD-286 (1956), Method No. 506.1 | 60–70 |
| Vehicle, consisting of approximately: 92% by weight of pine oil, 8% by weight of ethyl, cellulose | 40–30 |
| | 100 |

The proportions of pine oil and ethyl cellulose in the vehicle may be varied slightly to adjust the viscosity of the vehicle to the desired value for screening.

This formulation is dried in a warm air circulating atmosphere prior to use, except where very thin layer (e.g., 1 mil to 2 mils thick) are applied and allowed to dry at room temperature over a sufficiently long period of time.

Where difficulty is encountered in mixing the lead azide in the higher weight percentages with the vehicle in the three formulations, particularly in Example I, the lead azide may be moistened with a small amount of nitrocellulose (e.g., 0.05 ml. nitrocellulose/gm. lead azide and vehicle) to facilitate mixing with the vehicle.

Each of the formulations hereinabove discussed may be used in the manner described in copending U.S. Pat. application Ser. No. 68,431, filed Aug. 31, 1970 and entitled "Explosive Bonding of Workpieces." or in other explosive forming processes which may be known to the art.

The formulations hereinabove disclosed are primary explosives rather than secondary explosives and may be detonated electrically, mechanically or thermally (resistance heating or infra-red heating).

The following velocities of detonation ($V_D$) were noted for the extreme ranges of lead azide composition of the three formulations, each applied as a layer 10 mils in thickness:

| Formulation | $V_D$(ft./sec.) air dried | $V_D$(ft./sec.) oven dried |
|---|---|---|
| Example I: | | |
| 70% by weight lead azide | 9,730 | 10,420 |
| 60% by weight lead azide | 8,860 | 8,770 |
| Example II: | | |
| 70% by weight lead azide | 3,940 | 10,290 |
| 60% by weight lead azide | [1] | 2,620 |
| Example III: | | |
| 70% by weight lead azide | 11,000 | 10,680 |
| 60% by weight lead azide | 8,460 | 8,500 |

[1] Must be oven dried for use.

It is apparent from the foregoing tabulation of detonation velocities and lead azide concentrations for the three examples that one is able to control to a substantial degree the detonation velocity of each formulation within the composition limits hereinabove given.

What is claimed is:

1. Primary explosive composition useful in explosive bonding, forming or similar processes, said composition comprising:

a. 60–70% by weight of colloidal lead azide;

b. balance essentially vehicle selected from the group consisting of:

i. beta-terpineol in an amount equal to approximately 92% by weight of the vehicle, ethyl cellulose constituting the balance of the vehicle;

ii. Beta-terpineol in an amount equal to approximately 90% by weight of the vehicle, polyvinyl butyral constituting the balance of the vehicle; and iii. pine oil in amount equal to approximately 92% by weight of the vehicle, ethyl cellulose constituting the balance of the vehicle.

2. Primary explosive composition as in claim 1, wherein:

c. the colloidal lead azide has a mean particle size of 3.4$\mu$.

3. Primary explosive composition as in claim 1, further comprising:

c. a small amount of niitrocellulose sufficient only to promote mixing of the lead azide and the vehicle.

4. Primary exposive composition as in claim 1, further comprising:

c. approximately 0.05 ml. nitrocellulose per gram of lead azide and vehicle to promote mixing of the lead azide and the vehicle.

5. Screen-printable primary explosive composition useful in explosive bonding, forming or similar processes, said composition comprising:

a. 60–70% by weight of colloidal lead azide;

b. balance vehicle consisting of:

i. beta-terpineol in an amount equal to approximately 92% by weight of the vehicle;

ii. ethyl cellulose constituting the balance of the vehicle.

6. Primary explosive composition as in claim 5 wherein:

c. the colloidal lead azide has a mean particle size of 3.4$\mu$.

7. Screen-printable primary explosive composition useful in exposive bonding, forming or similar processes, said composition comprising:

a. 60–70% by weight of colloidal lead azide;

b. balance vehicle consisting of:

i. beta-terpineol in an amount equal to approximately 90% by weight of the vehicle;

ii. polyvinyl butyral constituting the balance of the vehicle.

8. Primary explosive composition as in claim 7 wherein:

c. the colloidal lead azide has a mean particle size of 3.4$\mu$.

9. Screen-printable primary explosive composition useful in explosive bonding, forming or similar processes, said composition comprising:

a. 60–70% by weight of colloidal lead azide;

b. balance vehicle consisting of:

i. pine oil in an amount equal to approximately 92% by weight of the vehicle;

ii. ethyl cellulose constituting the balance of the vehicle.

10. Primary explosive composition as in claim 9, wherein:

c. the colloidal lead azide has a mean particle size of 3.4$\mu$.

*11. Primary explosive composition useful in explosive bonding, forming or similar processes, said composition comprising:*

*a. 60–70% by weight of lead azide;*

*b. balance essentially vehicle selected from the group consisting of:*

*i. beta-terpineol in an amount equal to approximately 92% by weight of the vehicle, ethyl cellulose constituting the balance of the vehicle;*

*ii. beta-terpineol in an amount equal to approximately 90% by weight of the vehicle, polyvinyl butyral constituting the balance of the vehicle; and*

*iii. pine oil in an amount equal to approximately 95% by weight of the vehicle, ethyl cellulose constituting the balance of the vehicle.*

*12. Primary explosive composition as in claim 11, wherein:*

*c. the lead azide is finely divided.*

*13. Primary explosive composition as in claim 11, further comprising:*

*c. a small amount of nitrocellulose sufficient only to promote mixing of the lead azide and the vehicle.*

*14. Primary explosive composition as in claim 11, further comprising:*

*c. approximately 0.05 ml. nitrocellulose per gram of lead azide and vehicle to promote mixing of the lead azide and the vehicle.*

* * * * *

UNITED STATES PATENT OFFICE
CERTIFICATE OF CORRECTION

Patent No. Re 28,473 Dated July 8, 1975

Inventor(s) TERRI GIVERSEN STEELE

It is certified that error appears in the above-identified patent and that said Letters Patent are hereby corrected as shown below:

IN THE SPECIFICATION:

Column 1, line 13, "foaming" should read --forming--.

Column 2, EXAMPLE III, line 65, "ethyl," should read --ethyl--.

Column 3, line 18, ""Explosive Bonding of Workpieces."" should read --"Explosive Bonding of Workpieces,"--; under Formulation, Example II: line 37, "60% by weight lead azide 1" should read --60% by weight lead azide (1)--.

IN THE CLAIMS:

Column 4, line 3, "niitrocellulose" should read --nitrocellulose--; line 5, "exposive" should read --explosive--; line 24, "exposive" should read --explosive--; line 63, "95%" should read --92%--.

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*